United States Patent
Ellis

(10) Patent No.: US 10,186,091 B2
(45) Date of Patent: *Jan. 22, 2019

(54) WHEEL HUB SAFETY DEVICES, SYSTEMS AND METHODS

(71) Applicant: Justin C. Ellis, Boise, ID (US)

(72) Inventor: Justin C. Ellis, Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,435

(22) Filed: Apr. 14, 2018

(65) Prior Publication Data

US 2018/0232966 A1 Aug. 16, 2018

Related U.S. Application Data

(63) Continuation of application No. 15/406,941, filed on Jan. 16, 2017, now Pat. No. 9,947,151.

(60) Provisional application No. 62/279,151, filed on Jan. 15, 2016.

(51) Int. Cl.
| | |
|---|---|
| *G07C 5/08* | (2006.01) |
| *B60Q 5/00* | (2006.01) |
| *G07C 5/00* | (2006.01) |
| *B60C 5/00* | (2006.01) |
| *B60B 27/06* | (2006.01) |

(52) U.S. Cl.
CPC ............ *G07C 5/0825* (2013.01); *B60C 5/005* (2013.01); *B60Q 5/005* (2013.01); *G07C 5/006* (2013.01); *G07C 5/0816* (2013.01); *B60B 27/065* (2013.01); *B60B 2900/3312* (2013.01); *B60Y 2306/15* (2013.01)

(58) Field of Classification Search
USPC .. 340/438, 425.5, 426.33, 686.1, 686.2, 457
See application file for complete search history.

(56) References Cited

U.S. PATENT DOCUMENTS

| | | |
|---|---|---|
| 6,158,933 A | 12/2000 | Nicholson |
| 6,595,597 B2 | 7/2003 | Marczynski et al. |
| 8,872,668 B2 * | 10/2014 | Schnare ............... G01B 7/003 340/686.1 |
| 9,947,151 B2 * | 4/2018 | Ellis ..................... G07C 5/0825 |
| 2009/0207008 A1 | 8/2009 | Malis et al. |

OTHER PUBLICATIONS

"Non-Final Office Action", U.S. Appl. No. 15/406,941, dated Sep. 5, 2017, 7 pages.
"Notice of Allowance", U.S. Appl. No. 15/406,941, dated Jan. 24, 2018, 5 pages.

* cited by examiner

*Primary Examiner* — Brent Swarthout
(74) *Attorney, Agent, or Firm* — Colby Nipper PLLC

(57) ABSTRACT

A wheel hub safety device is for a vehicle having a hub and a wheel. The hub having a plurality of opposing equiradially disposed wheel bolts. The wheel having a plurality of opposing equiradially disposed holes spaced for mating engagement with the wheel bolts on the hub. The wheel is configured for attachment to the hub through use of a plurality of lug nuts. The wheel hub safety device has a housing and a plurality of lug nut rotation detectors. The housing is for housing the plurality of lug nut rotation detectors, at least one sensor and a transmitter.

20 Claims, 11 Drawing Sheets

WHEEL HUB SAFETY DEVICES, SYSTEMS AND METHODS

PRIORITY/CROSS-REFERENCE TO RELATED APPLICATIONS

This application is a continuation of U.S. Non-Provisional application Ser. No. 15/406,941, filed Jan. 15, 2017 and issued as U.S. Pat. No. 9,947,151 on Apr. 17, 2018, and claims the benefit of U.S. Provisional Application No. 62/279,151, filed Jan. 15, 2016, the disclosure disclosures of which are incorporated by reference.

TECHNICAL FIELD

The disclosure generally relates to the field of transportation. Particular embodiments relate to devices, systems and methods of addressing wheel hub safety issues on motorized vehicles.

BACKGROUND

The inventive concepts disclosed herein comprise devices, systems and methods of addressing wheel hub safety issues on motorized vehicles.

SUMMARY OF THE DISCLOSURE

Several exemplary wheel hub safety devices, systems and methods are described herein.

An exemplary wheel hub safety device is for a vehicle having a hub and a wheel. The hub having a plurality of opposing equiradially disposed wheel bolts. The wheel having a plurality of opposing equiradially disposed holes spaced for mating engagement with the wheel bolts on the hub. The wheel is configured for attachment to the hub through use of a plurality of lug nuts. The wheel hub safety device has a housing and a plurality of lug nut rotation detectors. The housing is for housing the plurality of lug nut rotation detectors. The housing comprises a plurality of equiradially disposed lug passageways therethrough. Each of the equiradially disposed lug passageways is configured to receive one of the lug nut rotation detectors therein. Each lug nut rotation detector comprises a tubular portion configured for interference fit onto one of the lug nuts.

Optionally, each of the lug nut rotation detectors on the above exemplary wheel hub safety device comprise a first arm extending generally perpendicularly from a first side of the tubular portion. Further optionally, the each of the lug nut rotation detectors could further comprise a second arm extending generally perpendicularly from a second side of the tubular portion.

Optionally, each of the lug nuts on the above exemplary wheel hub safety device comprise a plurality of nut shoulders meeting at a plurality of points, and the tubular portions comprise a plurality of point recesses configured for receiving the points therein.

Optionally, the lug nut rotation detectors on the above exemplary wheel hub safety device further comprise at least one indicator for visually indicating the position of the lug nut rotation detector on the lug nut. Further optionally, the housing comprises an outer face through which the lug passageways are defined, the outer face comprises indicia adjacent the lug passageways, and the at least one indicator can be oriented with respect to the indicia when the wheel hub safety device is installed on the wheel so that movement of the indicator relative to the indicia indicates rotation of the lug nut on the wheel bolt.

Optionally, the above exemplary wheel hub safety device further comprises at least one rotation sensor for sensing the rotation of at least one of the lug nuts, where the rotation sensor generating a rotation signal based on the rotation. Further optionally, the rotation sensor generates the rotation signal when the rotation is greater than a predetermined limit.

Optionally, the above exemplary wheel hub safety device further comprises at least one rotation sensor for sensing the rotation of at least one of the lug nuts, where the rotation sensor comprises a contact bridge on at least one of the lug nut rotation detectors, and a pair of fixed contacts on the housing—the contact bridge configured for bridging the pair of fixed contacts on the housing, thereby closing a circuit and generating the rotation signal. Further optionally, the rotation signal is transmitted by a transmitter to a receiver, and a processor receives the rotation signal from the receiver, and the processor generates an alarm signal for warning the operator of the vehicle of a loose lug nut.

Optionally, the above exemplary wheel hub safety device further comprises at least one rotation sensor for sensing the rotation of at least one of the lug nuts, where the rotation sensor comprises a contact bridge on at least one of the lug nut rotation detectors, and a pair of fixed contacts on the housing—the contact bridge configured for bridging the pair of fixed contacts on the housing, thereby closing a circuit and generating the rotation signal, and the receiver connects with an alarm, and the alarm is activated by the rotation signal, thereby warning the operator of the vehicle of a loose lug nut.

Optionally, the above exemplary wheel hub safety device wherein the housing comprises a lower wall spaced apart by an upper wall, and an outer ring wall spaced apart from an inner ring wall, and the lower wall and the upper wall each comprises a plurality of aligned equiradially disposed lug holes therethrough which define first and second ends of the lug passageways. Optionally, the pairs of spaced apart walls can define an internal cavity within the housing and the lug passageways can extend through the internal cavity.

Another exemplary wheel hub safety device comprises the above exemplary wheel hub safety device and one or more of Options A through F above.

Another exemplary wheel hub safety device comprises the above exemplary wheel hub safety device and one or more of Options A through F above and one or more of the options listed above.

Additional understanding of the devices and methods contemplated and/or claimed by the inventor can be gained by reviewing the detailed description of exemplary devices and methods, presented below, and the referenced drawings.

DEFINITIONS

Figure 1:
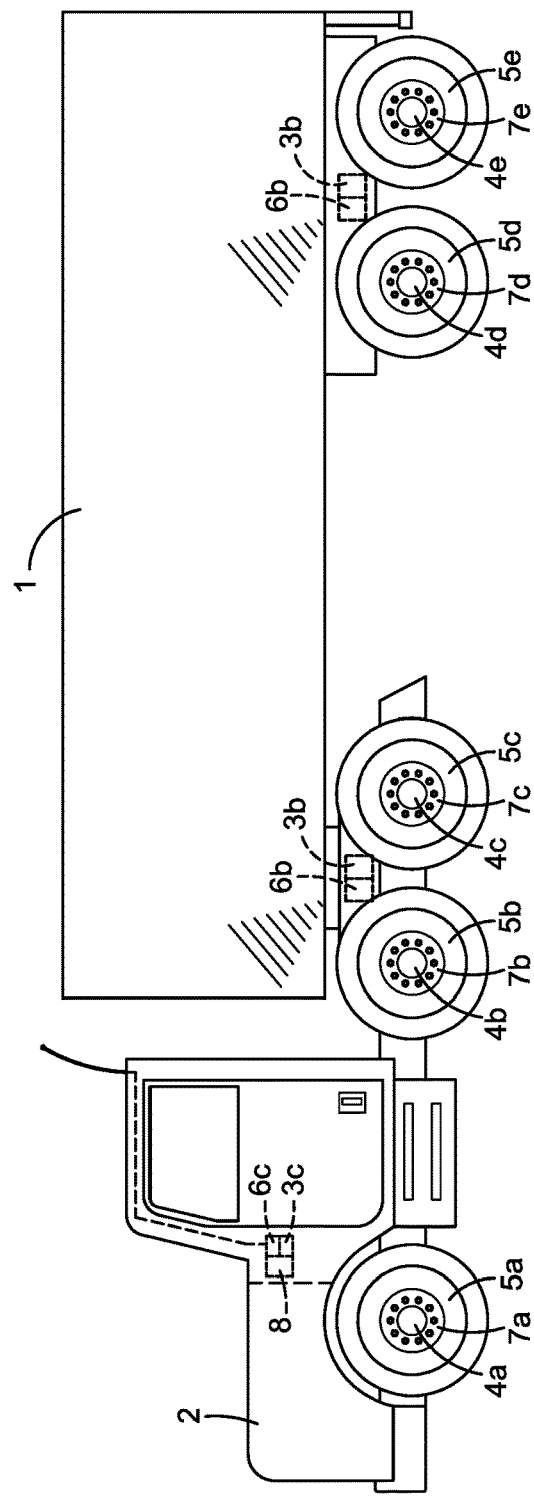
FIG. 1 is a side view of a first exemplary tractor and semi-trailer implementing a first exemplary wheel hub safety system.

The use of "e.g.," "etc," "for instance," "in example," "for example," and "or" and grammatically related terms indicates non-exclusive alternatives without limitation, unless the context clearly dictates otherwise. The use of "including" and grammatically related terms means "including, but not limited to," unless the context clearly dictates otherwise. The use of the articles "a," "an" and "the" are meant to be interpreted as referring to the singular as well as the plural, unless the context clearly dictates otherwise. Thus, for example, reference to "a sensor" includes two or more such sensors, and the like. The use of "optionally," "alternatively," and grammatically related terms means that the subsequently described element, event or circumstance may or may not be present/occur, and that the description includes instances where said element, event or circumstance occurs and instances where it does not. The use of "preferred," "preferably," and grammatically related terms means that a specified element or technique is more acceptable than another, but not that such specified element or technique is a necessity, unless the context clearly dictates otherwise. The use of "exemplary" means "an example of" and is not intended to convey a meaning of an ideal or preferred embodiment. Words of approximation (e.g., "substantially," "generally"), as used in context of the specification and figures, are intended to take on their ordinary and customary meanings which denote approximation, unless the context clearly dictates otherwise.

The use of "power source" means a source of electrical energy for powering an electrical device, including but not limited to batteries, rechargeable batteries, capacitors, ultracapacitors, and combinations thereof, unless the context clearly indicates otherwise. Examples of power sources include, but are not limited to, rechargeable nickel metal hydride (NiMH) batteries, rechargeable lithium ion (Li-on) batteries, capacitors, alkaline batteries, power cells, piezoelectric energy harvesters, automotive 12-volt systems, 24-volt systems.

The use of "processor" means a programmable analog and/or digital device that can store, retrieve, and process data; a handheld computing device (e.g., a mobile phone, a tablet computer); a computer; a microprocessor; a microcontroller; a microcomputer; or any suitable processing device or apparatus, unless the context clearly dictates otherwise.

The use of "user interface" means any device for rendering information to a user and/or requesting information from the user, including but not limited to a digital screen, monitor, display, visual indication device (such as a light), and an audio element emitted from a speaker, unless the context clearly dictates otherwise.

The use of "sensor" means a device that detects events or changes in quantities and provides a corresponding output, generally as an electrical or optical signal, unless the context clearly indicates otherwise. Examples of sensors include, but are not limited to: acoustic sensors, vibration sensors, electrical sensor, electric current sensors, electric potential sensors, magnetic sensors, radio sensors, environmental sensors, moisture sensors, humidity sensors, motion sensors, position sensors, angle sensors, displacement sensors, distance sensors, speed sensors, acceleration sensors, electrooptical sensors, pressure sensors, thermal sensors, and proximity sensors.

DETAILED DESCRIPTION

The following description and the referenced drawings provide illustrative examples of that which the inventor regards as his invention. As such, the embodiments discussed herein are merely exemplary in nature and are not intended to limit the scope of the invention, or its protection, in any manner. Rather, the description and illustration of these embodiments serve to enable a person of ordinary skill in the relevant art to practice the invention.

The inventive concepts disclosed herein comprise devices, systems and methods of addressing wheel hub safety issues on vehicles.

Vehicles have a plurality of wheel hubs. A wheel hub is the mounting assembly for the wheel of a vehicle. The wheel hub houses the wheel bearings and supports the lugs onto which the wheel is mounted through use of a number of lug nuts. The wheel hub permits the wheel to spin on the bearing while the wheel hub remains attached to the vehicle.

In one general example of a typical arrangement, the vehicle has an axle that terminates in a spindle having a threaded end. A wheel hub and wheel bearings are received onto the spindle, and a castle nut is then is fastened onto the threaded end of the spindle, thereby holding the wheel hub onto the axle, with the wheel hub able to rotate relative to the axle. The wheel hub supporting a number of wheel lugs onto which a wheel can be bolted via a number of lug nuts. Again, this is merely a general description of a typical arrangement, and a skilled artisan will be able to select an appropriate structure for the connection between the wheel hub and the vehicle in a particular embodiment based on various considerations.

FIG. 1 is a side diagram illustration of a first exemplary wheel hub safety system and method. The system 9 illustrated in FIG. 1 is implemented on a vehicle, such as a semi-trailer truck comprises a tractor unit 2 and a semi-trailer 1. Both the tractor unit 2 and the semi-trailer 1 comprise axles to which wheel hubs having tires are attached. As discussed above, in other exemplary systems, the wheel hubs may attach to the vehicle using other structures other than axles.

In this illustration, only the near-most wheel hubs (and tires) are illustrated, and as is known in vehicles of the type, additional wheel hubs (and tires) may exist on the near-side and/or far side of the vehicle on the same axles as the wheel hubs illustrated. Such additional wheel hubs may further include implementations of the inventive concepts.

The tractor unit 2 having a plurality of wheel hubs, illustrated as wheel hubs 4a, 4b, and 4c, onto which wheels (5a, 5b, 5c) are respectively attached. The semi-trailer 1 also having a plurality of wheel hubs, illustrated as wheel hubs 4d and 4e, onto which wheels (5d, 5e) are respectively attached. Each of the hubs (4a, 4b, 4c, 4d, 4e) having a plurality of opposing equiradially disposed wheel bolts. The wheel (5a, 5b, 5c, 5d, 5e) having a plurality of opposing equiradially disposed holes spaced for mating engagement with the wheel bolts on the hubs. The wheels configured for attachment to the hubs through use of a plurality of lug nuts (not illustrated).

The system 9 further comprises a wheel hub safety device (7a, 7b, 7c, 7d, 7e) connecting to each hub (4a, 4b, 4c, 4d, 4e) via the lug nuts. Alternatively, the wheel hub safety devices (7a, 7b, 7c, 7d, 7e) could attach to each wheel (5a, 5b, 5c, 5d, 5e). While a wheel hub safety device is illustrated in this Figure as being on each wheel, a skilled artisan will be able to select an appropriate number of wheel hub safety devices utilized and which wheels and/or wheel hubs the wheel hub safety devices are installed in a particular embodiment based on various considerations, including the intended use of the vehicle, the intended arena within which the vehicle will be used, and the equipment and/or accessories with which the vehicle is intended to be used, among other considerations. Further, the hub and wheel of a vehicle are rotating masses, but other rotating masses which could utilize the present invention(s) exist, including but not limited to propeller shafts, tank wheels, and space shuttle carrier wheels. A skilled artisan will be able to select an appropriate configuration of a wheel hub safety devices in a particular embodiment based on various considerations, including the intended use of the vehicle, the intended arena within which the vehicle will be used, and the equipment and/or accessories with which the vehicle is intended to be used, among other considerations.

The wheel hub safety devices (7a, 7b, 7c, 7d, 7e) comprise one or more sensors for monitoring one or more safety issues, such as loose (or tightening) lug nuts, wheel and wheel hub wobble, hub overheating, and rotation of the complete hub assembly, and generating one or more signals regarding the same.

The wheel hub safety devices (7a, 7b, 7c, 7d, 7e) comprise transmitters for transmitting a signal to a receiver. The signal may relate to the monitored safety issue. One or more receivers (3a, 3b, 3c) could be located in another of the wheel hub safety devices, the receiver could be located on an adjacent portion of the tractor unit 2 or semi-trailer 1, the receiver could be located on a distant portion of the tractor unit 2 or semi-trailer 1. A receiver/transmitter pair could work as a repeater (transmitter amplifier) for repeating the signal to the receiver.

Alternatively, the receiver 3 could comprise one or more further transmitters (6a, 6b, 6c) for retransmitting the signal to another receiver 3. The receiver 3 could be local or remote from the vehicle.

The receiver 3 may be connected to a computer system 8 for processing the signal. The computer system 8 could process the signal and determine whether the current situation requires logging a potential issue for the operator or owner of the vehicle to review later, immediately alerting the operator (and/or owner) of the vehicle of the issue, and the like. The operator of the vehicle could be alerted as to issue via an alarm, such as an audible alarm, a visual display, and the like. The computer system 8 is preferably connected to a display (such as a mobile device (tablet) screen for displaying information to the operator. A skilled artisan will be able to select an appropriate structure and configuration for the display in a particular embodiment based on various considerations, including the intended use of the wheel hub safety device, the intended arena within which the wheel hub safety device will be used, and the equipment and/or accessories with which the wheel hub safety devices is intended to be used, among other considerations.

Through such a system, the operator of the vehicle could be provided with instant warning of loose lug nuts, wheel and wheel hub wobble, hub overheating, detachment, and/or roll/anti-roll of complete hub assembly. The system could include a display providing the operator with a visual indication of loose lug nut(s), and also an electronic warning or alarm in the operator's cab. The warning can also be electronically transmitted to the vehicle owner's office or other location.

Such receivers and/or transmitters can be powered by a power source. Preferably, the receivers and/or transmitters—will be incased in a weather proof case, for instance a case made of one of the following plastic types: (Polypropylene (PP), Polyurethane (PUR), Poly-Vinyl-Chloride (PVC), ABS, Polyamide (PA, Nylon 6/6, Nylon 6), Polystyrene (PS), Polyethylene (PE), POM (polyoxymethylene), Polycarbonate (PC), Acrylic (PMMA), PBT (polybutylene terephthalate), Polyethylene Terephthalate (PET), ASA (acrylonitrile styrene acrylate). Optionally, some of the receivers and/or transmitters could have a removable power source that slides/locks in the side of the box unit with a weathertight seal. The removable power source will preferably be configured to fit a docking station, thereby enabling the removable power source to be charged with external charging contacts or otherwise.

The receivers and/or transmitters may be mounted with magnet, rubber strap, Velcro strap, screwed, taped, and or bolted to vehicle in a secure location. Where the power source is a battery, the operator could easily (and temporarily) install the receivers and/or transmitters on other vehicle units with ease.

A first embodiment of the inventive concept(s) of a wheel hub safety device 10 is illustrated in FIGS. 2 through 13. Some of the components illustrated in the drawings are illustrated partially for simplification of the drawings. For example, the wheel hub 20 and/or the wheel 40 in FIGS. 2, 3, 5, 6, 9 and 10.

Figure 2:
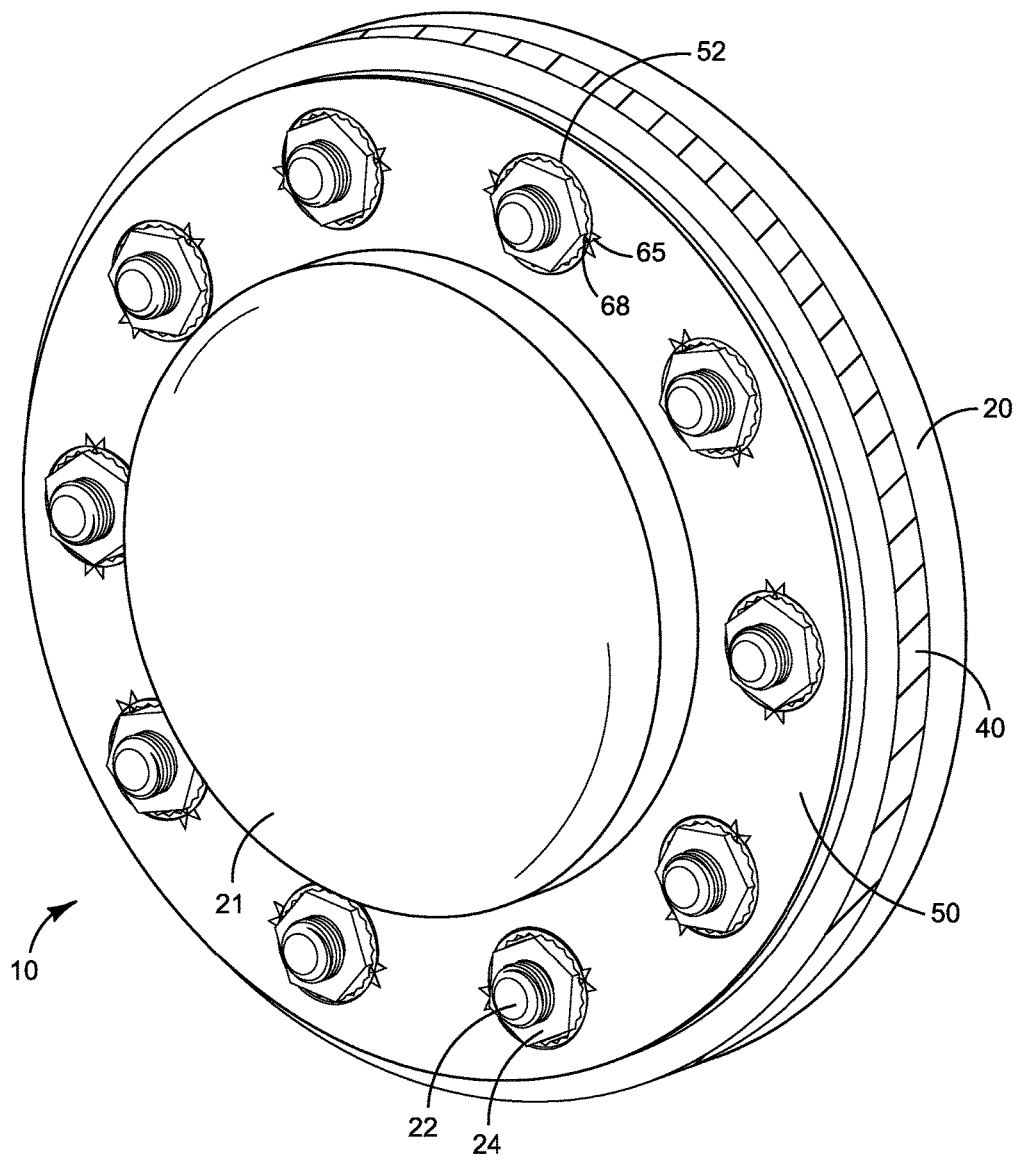
FIG. 2 is a partial, perspective view of a first exemplary wheel hub safety device.
Figure 3:
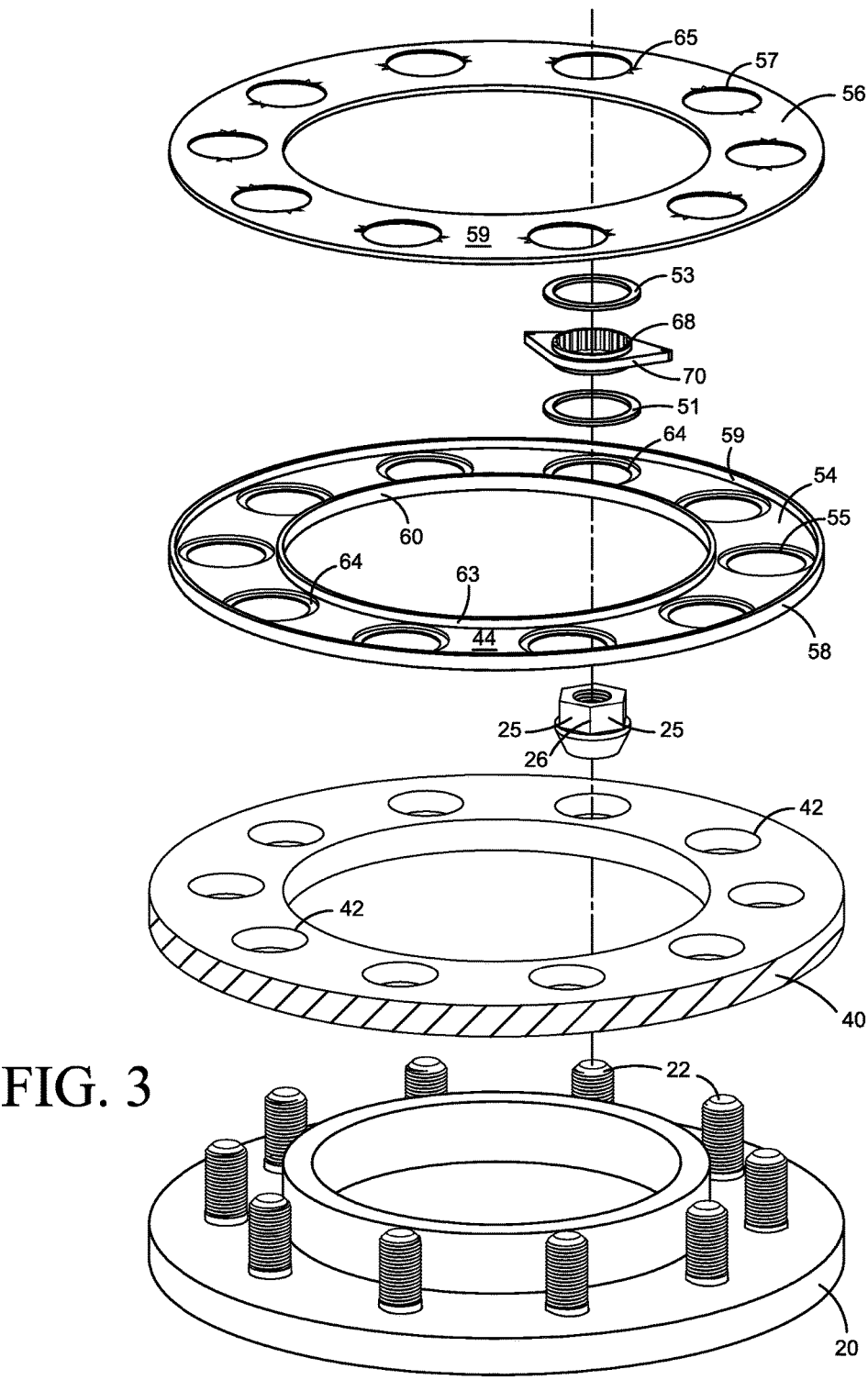
FIG. 3 is a partial, upper exploded view of the exemplary wheel hub safety device of FIG. 2.
Figure 4:
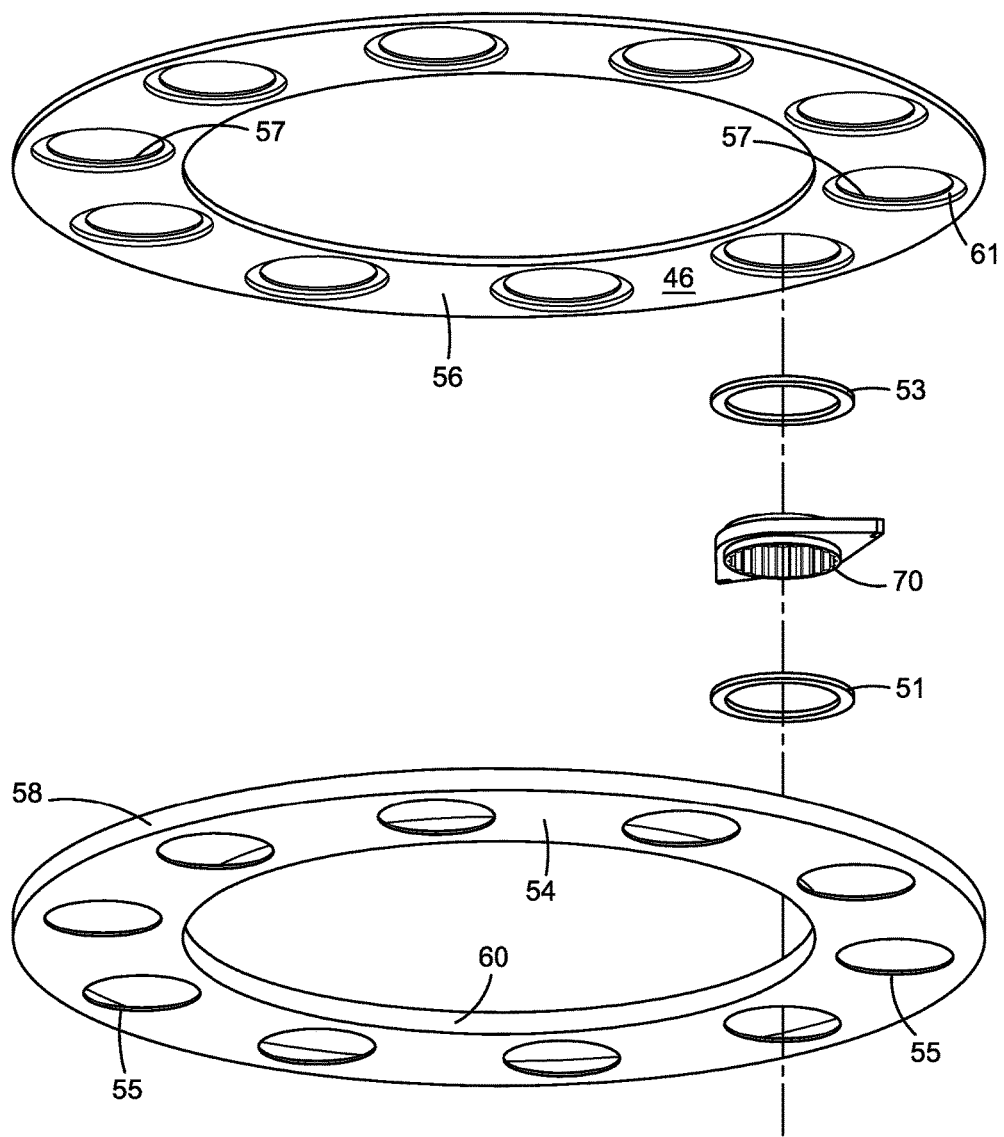
FIG. 4 is a partial, lower exploded view of the exemplary wheel hub safety device of FIG. 2.

Referring first to FIG. 2, a partial, perspective view of a first exemplary wheel hub safety device, the wheel hub safety device 10 is for a vehicle (not illustrated) having a wheel hub 20 and a wheel 40. FIG. 2 illustrates the wheel hub safety device 10 installed, via one or more lug nut mounts, on the lug nuts 24 which attach a wheel 40 to a wheel hub 20. The wheel hub 20 having a plurality of opposing equiradially disposed wheel bolts 22, as illustrated in FIG. 3, to which the lug nuts 24 engage. FIG. 3 is a partial, upper exploded view of the exemplary wheel hub safety device 10, also illustrating the wheel 40 and the wheel hub 20. FIG. 4 is a partial, lower exploded view of the exemplary wheel hub safety device 10, not illustrating the wheel 40 and the wheel hub 20. The wheel 40 having a plurality of opposing equiradially disposed bolt holes 42 spaced for mating engagement with the wheel bolts 22 on the wheel hub 20. The wheel 40 is configured for attachment to the wheel hub 20 through use of a plurality of lug nuts 24.

Figure 5:
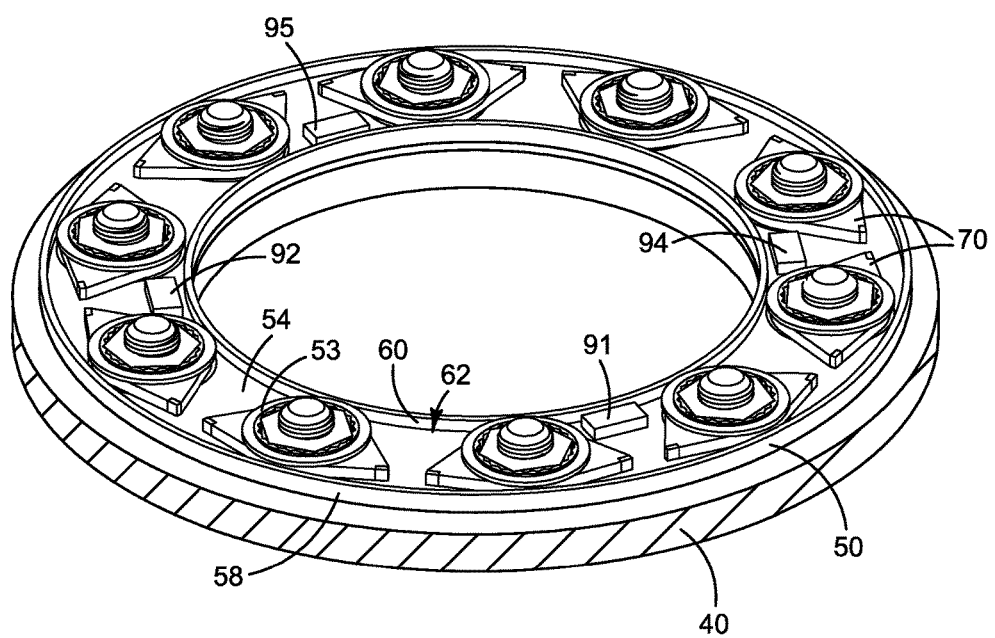
FIG. 5 is a partial, perspective view of the exemplary wheel hub safety device of FIG. 2.
Figure 6:
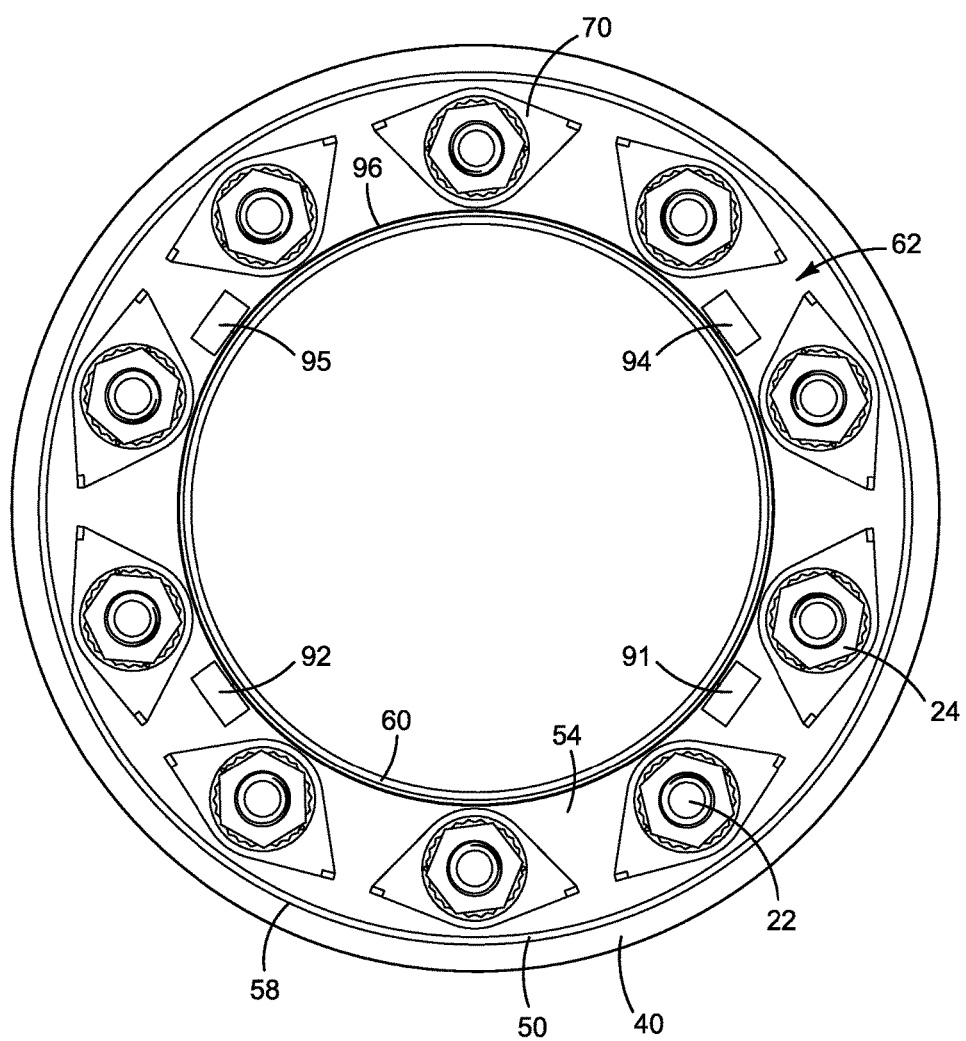
FIG. 6 is a partial, plan view of the exemplary wheel hub safety device of FIG. 2.

The wheel hub safety device 10 comprises a housing 50 and a plurality of lug nut mounts. In FIGS. 2 through 13, the lug nut mounts comprise lug nut rotation detectors 70. FIG. 5 illustrates a partial, perspective view of the exemplary wheel hub safety device 10, illustrated installed on the lug nuts 24 which attach a wheel 40 to a wheel hub 20. The wheel hub 20 is not illustrated in FIG. 5. The cover (upper wall 56) of the device 10 is not illustrated in FIGS. 5 and 6, so as to permit the details of the device 10 to be visible. FIG. 6 is a partial, plan view of the exemplary wheel hub safety device 10.

The housing 50 is for housing the plurality of lug nut rotation detectors 70, the rotation sensors 80, and the control system of the wheel hub safety device 10 therein. The housing 50 illustrated in FIGS. 2 through 13 comprises a lower wall 54 spaced apart by an upper wall 56, and an outer ring wall 58 spaced apart from an inner ring wall 60. The pairs of spaced apart walls defining an internal cavity 62 within the housing 50. The lower lug holes 55 preferably comprise a seat 61 for mating with an o-ring 51 or other seal. Further, the upper lug holes 57 preferably comprise a seat 64 for mating with an o-ring 53 or other seal. The seals for preventing dirt and other contaminations from entering into the internal cavity 62. The inner ring wall 60 further comprising an inner face 63. While the housing illustrated in FIGS. 2 through 13 comprises such a structure, a skilled artisan will be able to select an appropriate structure for the housing in a particular embodiment based on various considerations, including the intended use of the wheel hub safety device, the intended arena within which the wheel hub safety device will be used, and the equipment and/or accessories with which the wheel hub safety device is intended to be used, among other considerations.

Preferably, the housing 50 is molded component made or one or more of the following plastic components: Polypropylene (PP), Polyurethane (PUR), Poly-Vinyl-Chloride (PVC), ABS, Polyamide (PA), nylon (e.g., nylon 6/6, nylon 6), Polystyrene (PS), Polyethylene (PE), POM (polyoxymethylene), Polycarbonate (PC), Acrylic (PMMA), PBT (polybutylene terephthalate), Polyethylene Terephthalate (PET), and/or ASA (acrylonitrile styrene acrylate).

Preferably, the lug nut rotation detectors 70 sealingly engage the housing 50 through use of a seal, such as an O-ring 51, a square ring, or sweeper seal. Such a seal may be single, double or otherwise. Such a seal for protecting the rotation sensor 80 from environmental contamination. While such O-rings, square rings, and sweeper seals are mentioned, a skilled artisan will be able to select an appropriate structure and material for the seal in a particular embodiment based on various considerations, including the intended use of the device, the intended arena within which the device will be used, and the equipment and/or accessories with which the device is intended to be used, among other considerations.

The lower wall 54 comprises a plurality of equiradially disposed lower lug holes 55 defined therethrough. The upper wall 56 comprises a plurality of equiradially disposed upper lug holes 57 defined therethrough. The lower lug holes 55 and upper lug holes 57 aligned with one another so as to together define a plurality of lug passageways 52. The lug passageways 52 are configured for receiving the lug nuts 24 therethrough. The lug passageways 52 passing through the internal cavity 62.

The upper wall 56 further comprises an outer face 59. The outer face 59 comprises a plurality of indicia 65 thereon. The indicia 65 are adjacent the upper lug holes 57. Preferably, the indicia 65 are configured to represent an arc of rotation of the lug nuts 24. The lug nut rotation detectors 70 further comprise at least one indicator 68 for visually indicating the position of the lug nut rotation detector 70 on the lug nut 24.

The indicator 68 can be oriented with respect to the indicia 65 when the wheel hub safety device 10 is installed on the wheel 40 so that movement of the indicator 68 relative to the indicia 65 indicates rotation of the lug nut 24 on the wheel bolt 22. The indicia 65 and indicator 68 providing a visual indication of one or more loose lug nut(s) to the operator of the vehicle. In embodiments that utilize rotation sensors, the indicia 65 and indicator 68 further provide an external fail safe for the device 10, allowing for a visual indication of whether or not any of the lug nuts 24 have rotated.

In the embodiment illustrated in FIGS. 2 through 13, for the purposes of illustration the upper wall 56 is illustrated as being separable from the other three walls (the lower wall 54, the inner ring wall 60 and the outer ring wall 58). In an exemplary device, one or more of the walls may be removable to allow access to the internal cavity 62. When assembled, it is preferred that all walls be sealingly connected together so as to prevent contamination from entering into the internal cavity and the components housed therein.

Figures 7, 8:
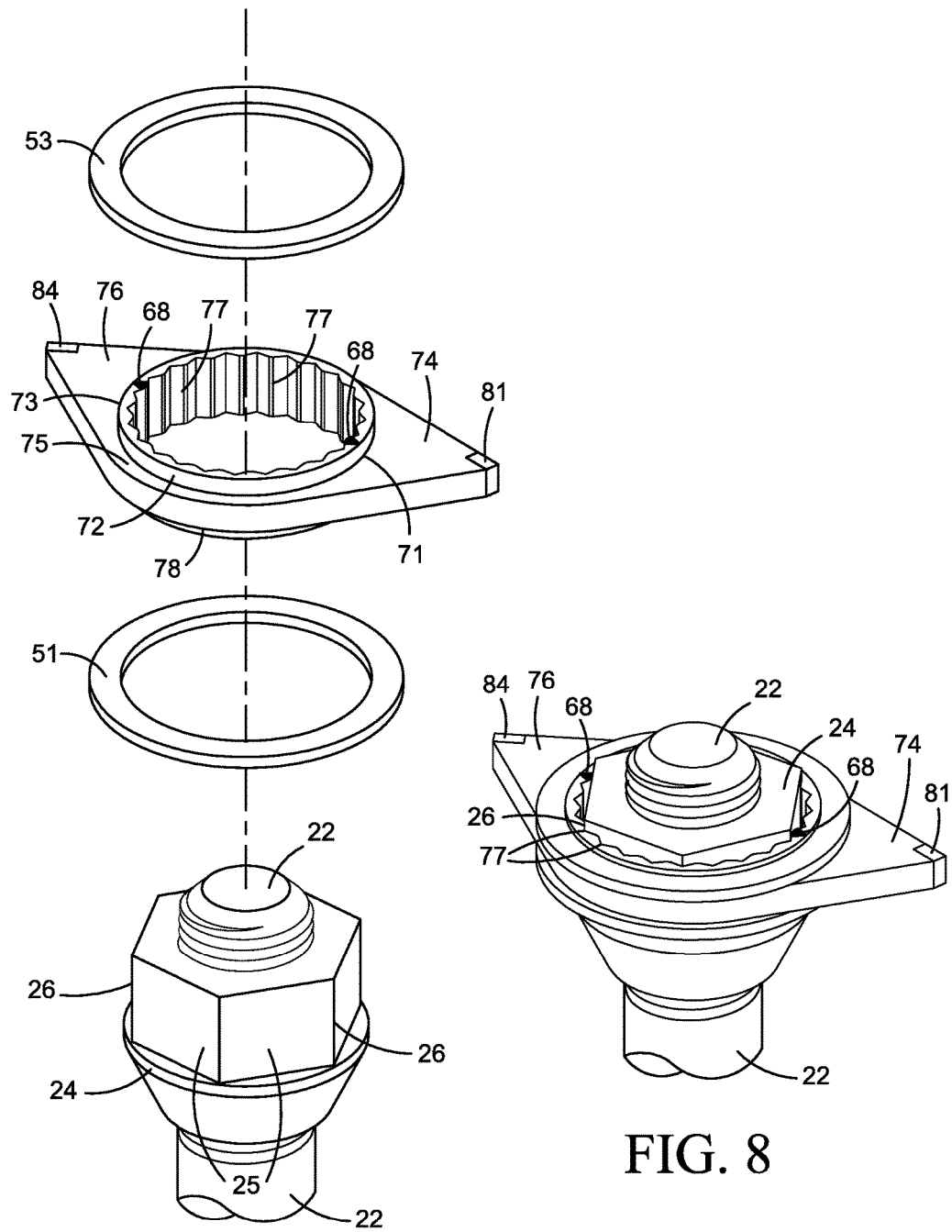
FIG. 7 is an exploded view of a rotation sensor of the exemplary wheel hub safety device of FIG. 2.
FIG. 8 is an assembled view of a rotation sensor of the exemplary wheel hub safety device of FIG. 2.

As particularly illustrated in FIGS. 7 and 8, the lug nut rotation detector 70 comprises a tubular portion 72 configured for interference fit with one of the lug nuts 24. Being an interference fit, the lug nut rotation detectors 70 (and attached housing 50) are semi-permanently mounted onto the wheel hub 20. FIG. 7 is an exploded view of a rotation sensor of the exemplary wheel hub safety device 10 and a partial illustration of a lug nut 24 attached onto a wheel bolt 22. FIG. 8 is an assembled view of a rotation sensor of the exemplary wheel hub safety device 10 and a partial illustration of a lug nut 24 attached onto a wheel bolt 22. The housing 50, the wheel 40, and the other components of the wheel hub 20 are not illustrated in FIG. 7 or 8.

Alternatively, two optional lug nuts with locking flanges (not illustrated) can be incorporated with each mounting location, the external flanges are larger than the diameter of lug nut. Such locking nuts would be located in 180 degree orientation to not degrade balance of rotational mass. Each flange can be attached to locking lug nut with two security bolts mounted in 180 degree orientation on nut that require a specific non-standard driving bit. Once the locking nut with flange is installed the housing and lug nut rotation detectors cannot fall off or be removed until the flange screws and flanges are removed.

Referring back to FIGS. 2 through 13, each detector 70 preferably further comprises a first arm 74 extending generally perpendicularly from a first side 71 of the tubular portion 72, and a second arm 76 extending generally perpendicularly from a second side 73 of the tubular portion 72. The tubular portion 72 with first arm 74 and second arm 76 is able to rotate within the lug passageway 52 until either one or both of the first arm 74 and the second arm 76 contact the housing. In such a configuration, the first arm 74 and second arm 76 to can impede further rotation of the lug nut 24 once the contact portion of one or both of the first and second arms is brought into contact with the inner face 63 of the inner ring wall 60, or the outer face 59 of the outer ring wall 58. In doing so, the detector 70 can prevent loosening or tightening of the lug nut 24 beyond a certain degree. It is preferred that the first arm 74 and second arm 76 of the detector 70 comprise a resilient material, allowing the arms to absorb the energy transferred from the rotating lug nut 24 through the detector 70 first arm 74 and/or second arm 76 and to the inner ring wall 60 and/or outer ring wall 58 before deforming. Alternatively, the first arm 71 and second arm 76 could comprise large contact portions for contacting the inner face 63 of the inner ring wall 60, or the outer face 59 of the outer ring wall 58. Alternatively, the first arm 71 and second arm 76 could comprise wedge shaped contact portions for contacting the inner face 63 of the inner ring wall 60, or the outer face 59 of the outer ring wall 58 and impeding further rotation of the lug nut 24 once the contact portion of one or both of the first and second arms is brought into contact with the inner face 63 of the inner ring wall 60, or the outer face 59 of the outer ring wall 58.

The lug nut rotation detector 70 may further comprise a seat 78 for receiving an o-ring 51 or other seal, the o-ring 51 for sealing engagement against a seat 61 of a lower lug hole 55. The lug nut rotation detector 70 may further comprise a seat 75 for receiving an o-ring 53 or other seal, the o-ring 53 for sealing engagement against a seat 64 of an upper lug hole 57.

Preferably, one of the lug nut rotation detectors 70 is received into each of the lug passageways 52. It is also preferred that each lug nut rotation detector 70 will rotate independently of one another. Preferably, the lug nut rotation detectors 70 will also assist preventing or hampering a lug nut 24 from loosening or tightening beyond the limit provided by the rotation relative to the lug nut rotation detector 70.

Each of the lug nuts 24 comprise a plurality of nut shoulders 25 adapted to be engaged by a tightening socket (not illustrated). The nut shoulders 25 meeting at a plurality of points 26. Each tubular portion 72 comprises a plurality of point recesses 77 configured for receiving the points 26 therein. The lug nuts 24 illustrated in the figures each include six nut shoulders 25 and six points 26. The plurality of point recesses 77 in an exemplary tubular portion 72 used with a six-sided lug nut 24 would preferably comprise a number of points 26 that is a multiple of six. In the preferred device 10, the number of points is forty-eight. The having a larger number of point recesses 77 permits a greater ability to more easily place the lug nut rotation detector 70 on the lug nut 24 so that the indicator 68 is generally centered in the indicia 65. This description describes a traditional lug nut. Where the lug nut on the vehicle is not a traditional lug nut, a skilled artisan will be able to select an appropriate structure and modifications for the lug nut rotation detector to enable it to engage the lug nut in a particular embodiment based on various considerations, including the intended use of the wheel hub safety device, the intended arena within which the wheel hub safety device will be used, and the equipment and/or accessories with which the wheel hub safety device is intended to be used, among other considerations.

Preferably, the device 10 is installed on the lug nuts 24 of the wheel hub 20 after all lug nuts 24 have been torqued to the lug nut torque specification specified for the wheel.

The device 10 preferably comprises a rotation sensor 80. The rotation sensor 80 for sensing the rotation of at least one of the lug nuts 24. The rotation sensor 80 for generating a rotation signal based on the rotation of the lug nut 24 in relation to a default position or in relation to a sensor position. Preferably, the rotation sensor 80 can generate the rotation signal when the rotation of the lug nut 24 from a default position is greater than a predetermined limit. The rotation sensor 80 can comprise any sensor or contact, combination of sensors and contacts. Further the rotation sensor 80 can be located anywhere useful for implementation of the device, for instance on a lug nut rotation detector 70, on or more of the arms of a lug nut rotation detector 70, on one or more of the inside walls of the internal cavity 62, including but not limited to the lower wall surface 44, the upper wall surface 46, the outer face 59, and the inner face 63.

Figure 9:
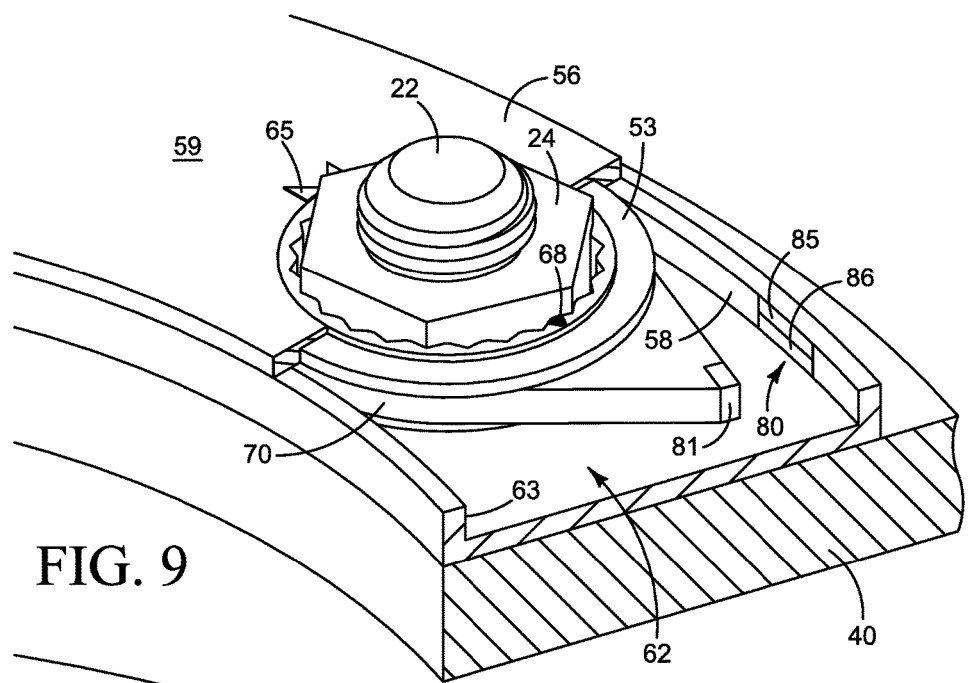
FIG. 9 is a partial, cross-sectional view of the exemplary wheel hub safety device of FIG. 2.
Figure 10:
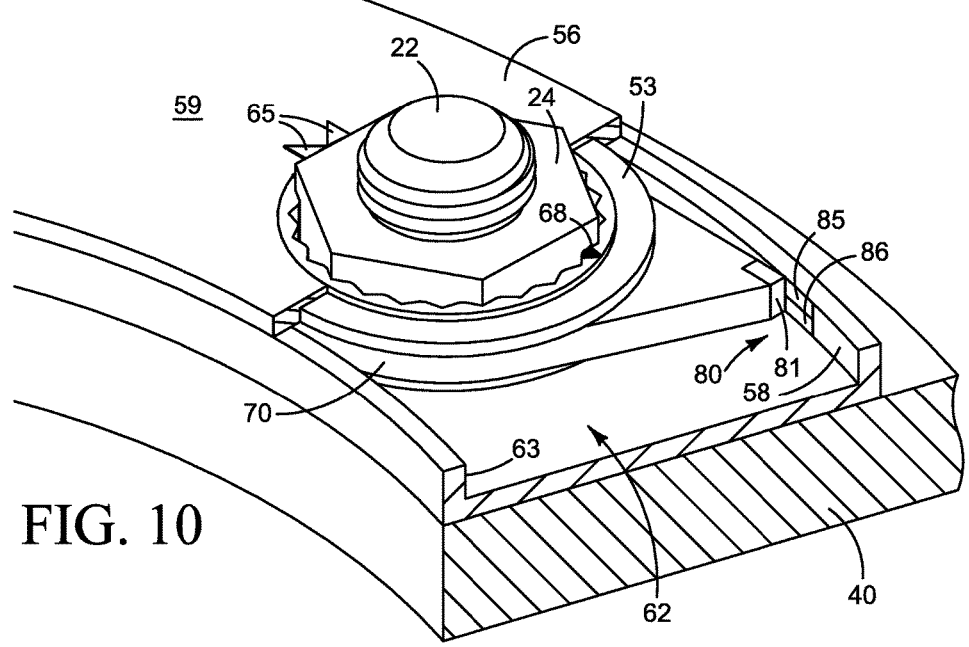
FIG. 10 is a partial, cross-sectional view of the exemplary wheel hub safety device of FIG. 2.

In FIGS. 2 through 13, particularly illustrated in FIGS. 9 and 10, the rotation sensor 80 is illustrated as a contact bridge 81 on a first arm 74 of a lug nut rotation detector 70, and a pair of fixed contacts 85, 86 on the housing 50. The contact bridge 81 configured for bridging the pair of fixed contacts 85, 86 on the housing 50, thereby closing a circuit and generating the rotation signal. Preferably, the contact bridge 81 and the fixed contacts 85, 86 all comprise a conductive metal (silver, copper, gold, aluminum or zinc). The fixed contacts 85, 86 may comprise a pair of annular bands encircling the outer ring wall 58. FIG. 9 is a partial, cross-sectional view of the exemplary wheel hub safety device 10. FIG. 10 is a partial, cross-sectional view of the exemplary wheel hub safety device 10. FIGS. 9 and 10 illustrate a portion of the upper wall 56 removed so as to expose other components and structure to view, for the purpose of illustration. The wheel 40 illustrated in FIGS. 9 and 10 is presented generally, for the purpose of illustration.

In FIGS. 3 through 13, the lug nut rotation detector 70 is illustrated has having a rounded center portion and a pair of lobe shaped arms (first arm 74, second arm 76). The tips of the first arm 74 and second arm 76 being generally 155 degrees apart relative to the center of the lug nut 24. While this shape is illustrated, a skilled artisan will be able to select an appropriate shape for a lug nut rotation detector 70 in a particular embodiment based on various considerations, including the intended use of the wheel hub safety device, the intended arena within which the wheel hub safety device will be used, and the equipment and/or accessories with which the wheel hub safety device is intended to be used, among other considerations.

Figure 11:
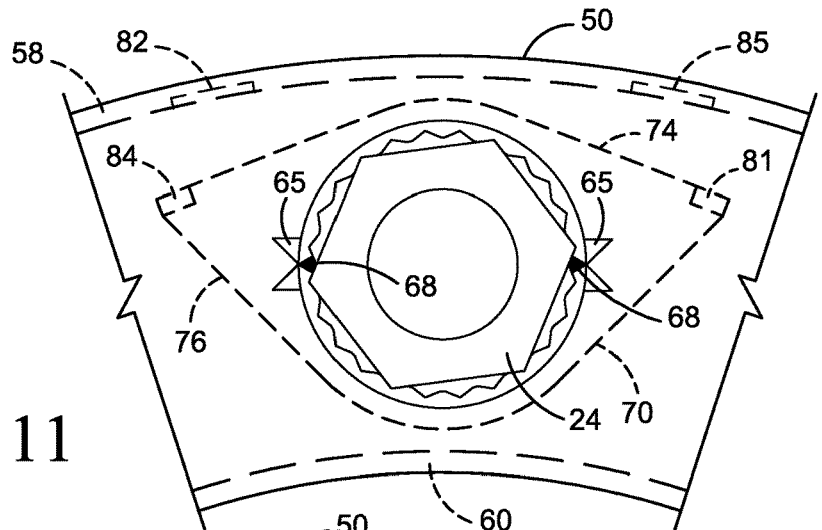
FIG. 11 is a partial plan sequential view of the exemplary wheel hub safety device of FIG. 2.
Figure 12:
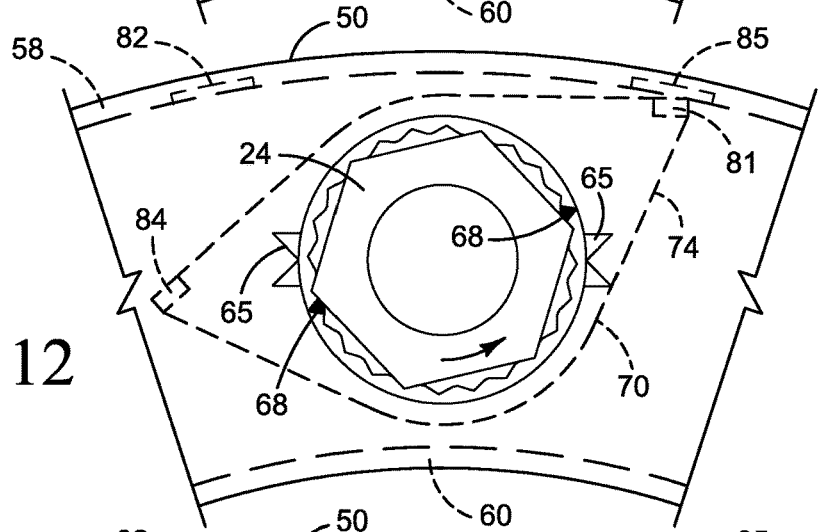
FIG. 12 is a partial plan sequential view of the exemplary wheel hub safety device of FIG. 2.
Figure 13:
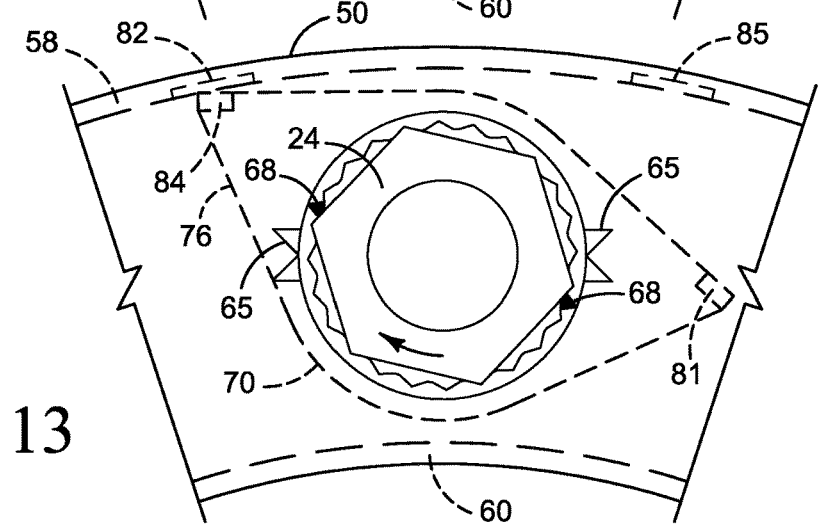
FIG. 13 is a partial plan sequential view of the exemplary wheel hub safety device of FIG. 2.

In the lug nut rotation detector 70 of FIGS. 2 through 13, the inner ring wall 60 comprises a pair of fixed contacts (contact 85 and contact 86) which are bridged by a conductive bridge contact 81 on the first arm 74. Optionally, the inner ring wall 60 could comprise a second pair of fixed contacts (contact 82 and a second contact (hidden)) which could be bridged by a conductive bridge contact 84 on the second arm 76. In FIGS. 11 through 13, illustrated is a first circuit has a contact 85 on the outer ring wall 58 and a second contact 86 on the outer ring wall 58, and a second circuit has a third contact 82 on the outer ring wall 58 and a fourth contact (not illustrated) on the outer ring wall 58. Wherein if the lug nut 24 loosens, contact 81 bridges fixed contacts 85 and 86, thereby completing a circuit and generating a signal. Wherein if the lug nut 24 tightens, contact 84 contacts the third contact 82 and fourth contact (hidden), thereby completing a circuit and generating a signal.

Alternatively, the rotation sensor 80 could comprise a toggle switch, a push-button switch, a selector switch, a joystick switch, a limit switch, a proximity switch, an optical switch, a pressure switch, or another type of switch or sensor.

Toggle switches are actuated by a lever angled in one of two or more positions. The common light switch used in household wiring is an example of a toggle switch. Most toggle switches will come to rest in any of their lever positions, while others have an internal spring mechanism returning the lever to a certain normal position, allowing for what is called "momentary" operation.

Push-button switches are two-position devices actuated with a button that is pressed and released. Most push-button switches have an internal spring mechanism returning the button to its "out," or "unpressed," position, for momentary operation. Some push-button switches will latch alternately on or off with every push of the button. Other push-button switches will stay in their "in," or "pressed," position until the button is pulled back out. This last type of pushbutton switches usually has a mushroom-shaped button for easy push-pull action.

Selector switches are actuated with a rotary knob or lever to select one of two or more positions. Like the toggle switch, selector switches can either rest in any of their positions or contain spring-return mechanisms for momentary operation.

A joystick switch is actuated by a lever, free to move in more than one axis of motion. One or more switch contact mechanisms are actuated depending on which way the lever is pushed, and sometimes by how far it is pushed. The circle-and-dot notation on the switch symbol represents the direction of joystick lever motion required to actuate the contact. Joystick hand switches are commonly used for crane and robot control.

Limit switches closely resemble rugged toggle or selector hand switches fitted with a lever pushed by the machine part. Often, the levers are tipped with a small roller bearing, preventing the lever from being worn off by repeated contact with the machine part.

Proximity switches sense the approach of a metallic machine part either by a magnetic or high-frequency electromagnetic field. Simple proximity switches use a permanent magnet to actuate a sealed switch mechanism whenever the machine part gets close. More complex proximity switches work like a metal detector, energizing a coil of wire with a high-frequency current, and electronically monitoring the magnitude of that current. If a metallic part (not necessarily magnetic) gets close enough to the coil, the current will increase, and trip the monitoring circuit. Another form of proximity switch is the optical switch, comprised of a light source and photocell. Machine position is detected by either the interruption or reflection of a light beam. Optical switches are also useful in safety applications.

Another form of switch is a pressure switch. Gas or liquid pressure can be used to actuate a switch mechanism if that pressure is applied to a piston, diaphragm, or bellows, which converts pressure to mechanical force.

Preferably the lug nut rotation detector 70 is flexible or deformable so as to not shatter easily. Preferably, the lug nut rotation detector 70 is a molded component made from one or more of the following plastic components: Polypropylene (PP), Polyurethane (PUR), Poly-Vinyl-Chloride (PVC), ABS, Polyamide (PA, Nylon 6/6, Nylon 6), Polystyrene (PS), Polyethylene (PE), POM (polyoxymethylene), Polycarbonate (PC), Acrylic (PMMA), PBT (polybutylene terephthalate), Polyethylene Terephthalate (PET), and/or ASA (acrylonitrile styrene acrylate).

The wheel hub safety device 10 may further comprise a control system for controlling the operation of the wheel hub safety device 10. The control system can comprise a number of components, including but not limited to one or more sensors, a controller, and a power source. In some exemplary devices, the lug nut rotation detector 70 is a component controlled by the control system. It is preferred that such components be rotationally balanced.

The control system is illustrated in FIGS. 2 through 13 as being located within the internal cavity 62 of the housing 50. In other exemplary embodiments, one or more components of the control system may be located outside of the internal cavity. The mass of the components of the control system would be distributed within the housing to maintain a rotational balance.

FIGS. 5 and 6 illustrate some possible components of the control system, namely the rotation sensor 80, a controller 95, a power source 92, a sensor 94, and a transmitter 91. One or more of such components may be present, for instance the control system may comprise multiple sensors. The control system may be integrated into one or more printed circuit boards. The components of the control system can be interconnected by wiring 96. Alternatively, the components could wirelessly connect with one another. While these components are illustrated with respect to the embodiment illustrated in FIGS. 2 through 13, a skilled artisan will be able to select an appropriate component or components for a particular embodiment based on various considerations, including the intended use of the wheel hub safety device, the intended arena within which the wheel hub safety device will be used, and the equipment and/or accessories with which the wheel hub safety device is intended to be used, among other considerations.

The controller 95 is for controlling the operation of the control system. The controller 95 may comprise a processor. The controller 95 may process signals received from sensors before transmitting them to the receiver via the transmitter 91. The controller 95 may execute control logic upon receiving a signal from a sensor. The controller 95, based on receiving a signal from a sensor, can generate an alarm signal for warning the operator of the vehicle of a loose lug nut. The alarm signal could result in one or more of triggering an audible alarm for the operator to hear, triggering a visual alarm for the operator to see, sending a notice to a computer (such as a tablet computing device) operated by the operator, and sending a remote notification to the operator's office. One or more of the components could be integrated together into the same component, for instance the controller 95 and transmitter 91 could be integrated into a single component.

The rotation sensor 80 is described in detail above.

The power source 92 is for providing electrical energy to the components of the control system. In the wheel hub safety device 10 illustrated in the drawings, the power source comprises a battery. In one exemplary embodiment, the housing 50 (with lug nut rotation detectors 70) can be removed from the wheel hub 20, and the housing 50 can be docked at a station so that the power source 92 can be charged with external charging contacts or otherwise. Optionally, power source 92 could be removable, for instance through opening a weathertight door and removing the power source from inside the internal cavity 62. The removable power source will preferably be configured to fit a docking station, thereby enabling the removable power source to be charged with external charging contacts or otherwise.

The transmitter 91 is for transmitting one or more signals to a receiver located on the vehicle. Such signals can include, but are not limited to, the rotation signal from the rotation sensor 80, sensor signals from sensors 94, and signals from the controller 95. The transmitter 91 can comprise a radio frequency transmitter, a 2.4 GHz transmitter, Bluetooth wireless technology (a wireless technology standard for exchanging data over short distances using short-wavelength UHF radio waves in the ISM band from 2.4 to 2.485 GHz), or another wireless standard.

The sensor 94 may comprise one or more sensors. The signal generated by the sensor 94 could be sent to the controller 95 for processing. Alternatively, the signal generated by the sensor 94 could be sent directly to the transmitter 91.

One example of a sensor 94 is a vibration or other sensor for detecting wheel wobble and/or wheel hub wobble. Another example of a sensor 94 is a temperature sensor for generating a temperature signal indicative of a temperature of the wheel hub, brakes, wheels, and/or tire.

In another example, the sensor 94 is a temperature sensor that is connected to the controller 95. Upon the sensor 94 indicating a temperature greater than desired operating temperature, such as those specified by component manufacturers (i.e. wheel, tire, hub, brakes, and wheel manufactures), the controller 95 could send a wireless signal (via a transmitter 91 in the control system) to a receiver and a display for viewing by the operator of the vehicle, informing the operator of the temperature issue. Examples of temperature sensors include, but are not limited to temperature switches, thermocouples, bimetallic strips, flame detectors, infrared thermometers, microbolometers, and pyrometers.

In another example, the sensor 94 is a motion sensor for detecting the movement of the wheel hub, brakes, wheels, and/or tire. Examples of motion sensors include, but are not limited to accelerometers, DC response sensors, speed switches and piezoresistive accelerometers.

In another example, the sensor 94 is a knock sensor for monitoring wheel bearing and wheel hub/brake issues. A knock sensor can be used to measure the amount of vibration generated inside the wheel hub during operation. One example of a knock sensor works on the principal of piezoelectricity: when pressure or vibration is applied to a piezoelectric material, it changes its shape and vice versa.

In another example, the sensor 94 is a sensor that senses if the wheel hub safety device 10, the wheel, the lug nuts, or the wheel hub detaches from the vehicle.

Preferably, the signals transmitted by a particular wheel hub safety device 10 will include identification information for allowing the computer system to indicate to the operator information regarding the location of the specific wheel or wheels is indicating an error state. Such identification information will assist the operator in making a faster physical inspection of the wheels of the vehicle checking for errors.

Beyond sending signals that indicate errors or issues with the wheel hub, the wheel hub safety device 10 could also send status signals (such as indicating that the device is operational and all sensors are performing nominally), diagnostic signals, etc.

Some of the sensors may monitor conditions and parameters differently. For example, some sensors might monitor constantly, whereas others may monitor at regular intervals.

Rotation sensors and/or accelerometers may also be used to activate and deactivate the device. For instance in one example, a temperature sensor and a knock sensor could monitor the system from once every second to once every thirty minutes, as determined and set by the operator to fit their needs. Wheel rotation sensors and wobble sensors could activate at each start from complete stop and stay operational until the vehicle stops. Then, once the vehicle is in motion, the accelerometers will be considered engaged and will not signal the operator until one or all rotating masses stop. Once the vehicle has stopped, the accelerometer will close, sending an instant signal. Signal will only show fault to operator if one or more of rotating assemblies stops while others continue to rotate. If all sensors show stopped rotating assemblies at once, the ring will go to default setting with no warnings being sent to the operator and/or the company remotely. The accelerometer, and one or more of the other components of the wheel hub safety device, will go into sleep mode while no faults in rotating masses are found to conserve battery life of the wheel hub safety device.

A second embodiment of the wheel hub safety device comprises: a housing, a plurality of lug nut rotation detectors, and at least one rotation sensor. The housing for housing the plurality of lug nut rotation detectors. The housing having a plurality of equiradially disposed lug passageways therethrough. Preferably, each of the equiradially disposed lug passageways receives one of the lug nut rotation detectors therein. Each lug nut rotation detector comprises a tubular portion configured for interference fit onto one of the lug nuts. The at least one rotation sensor is for sensing the rotation of at least one of the lug nuts, and when the rotation sensor senses that the rotation is greater than a predetermined limit, the rotation sensor generates the rotation signal. Alternatively, the processor could determine whether or not the rotation is greater than the predetermined limit and generate the rotation signal.

Preferably, the rotation sensor comprises a contact bridge on at least one of the lug nut rotation detectors, and a pair of fixed contacts on the housing. The contact bridge is preferably configured for bridging the pair of fixed contacts on the housing, thereby closing a circuit and generating the rotation signal.

Preferably, the rotation signal is transmitted by a transmitter to a receiver, and a processor receives the rotation signal from the receiver. The processor then generates an alarm signal for warning the operator of the vehicle of a loose lug nut.

Alternatively, the receiver could connect with the alarm, and the alarm could be activated by the rotation signal, thereby warning the operator of the vehicle of a loose lug nut.

Preferably, each of the lug nut rotation detectors comprises a first arm extending generally perpendicularly from a first side of the tubular portion, and a second arm extending generally perpendicularly from a second side of the tubular portion.

Preferably, the lug nut rotation detectors further comprise at least one indicator for visually indicating the position of the lug nut rotation detector on the lug nut. In such a configuration, the housing comprises an outer face through which the lug passageways are defined, and the outer face comprises indicia adjacent the lug passageways. The at least one indicator can be oriented with respect to the indicia when the wheel hub safety device is installed on the wheel so that movement of the indicator relative to the indicia indicates rotation of the lug nut on the wheel bolt.

A third embodiment of the wheel hub safety device comprises a housing, a plurality of lug nut rotation detectors, and at least one rotation sensor. The housing for housing the plurality of lug nut rotation detectors. The housing comprises a plurality of equiradially disposed lug passageways therethrough, wherein each of the equiradially disposed lug passageways receives one of the lug nut rotation detectors. Each lug nut rotation detector comprises a tubular portion configured for interference fit onto one of the lug nuts. Each of the lug nut rotation detectors comprise a first arm extending generally perpendicularly from a first side of the tubular portion, and a second arm extending generally perpendicularly from a second side of the tubular portion. The lug nut rotation detectors further comprise at least one indicator for visually indicating the position of the lug nut rotation detector on the lug nut. The housing comprises an outer face through which the lug passageways are defined. The outer face comprises indicia adjacent the lug passageways. The at least one indicator can be oriented with respect to the indicia when the wheel hub safety device is installed on the wheel so that movement of the indicator relative to the indicia indicates rotation of the lug nut on the wheel bolt. The at least one rotation sensor is for sensing the rotation of at one of the lug nuts. The rotation sensor generates a rotation signal based on the rotation, and the rotation sensor generates the rotation signal when the rotation is greater than a predetermined limit. The rotation sensor comprises a contact bridge on at least one of the lug nut rotation detectors, and a pair of fixed contacts on the housing. The contact bridge configured for bridging the pair of fixed contacts on the housing, thereby closing a circuit and generating the rotation signal. The rotation signal is transmitted by a transmitter to a receiver. The processor receives the rotation signal from the receiver, and the processor generates an alarm signal for warning the operator of the vehicle of a loose lug nut.

Figure 14:
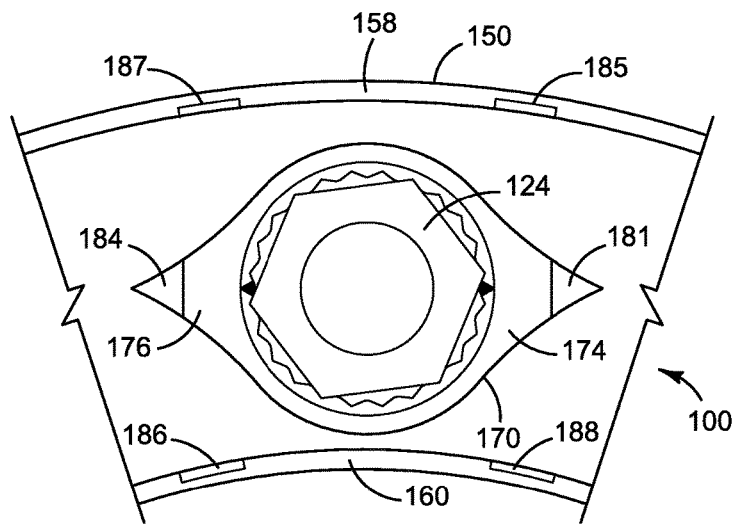
FIG. 14 is a partial plan sequential view of a second exemplary wheel hub safety device.
Figure 15:
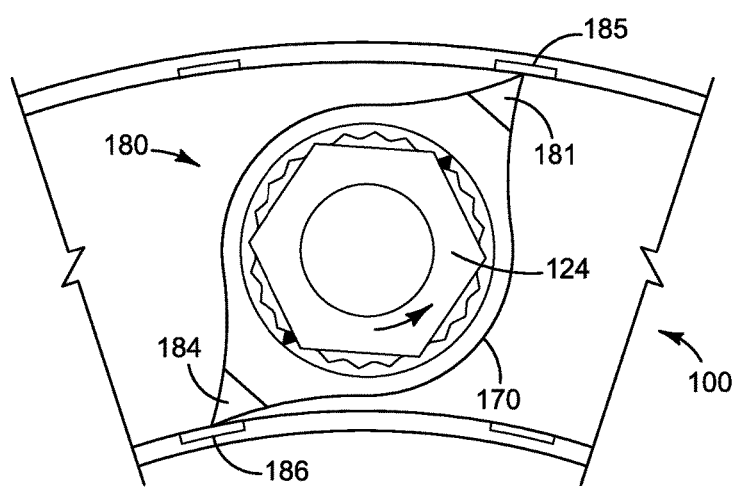
FIG. 15 is a partial plan sequential view of the second exemplary wheel hub safety device of FIG. 14.
Figure 16:
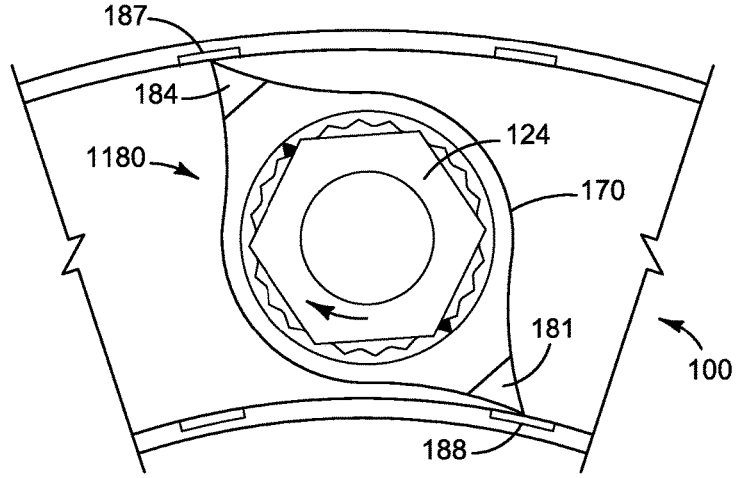
FIG. 16 is a partial plan sequential view of the second exemplary wheel hub safety device of FIG. 14.
Figure 17:
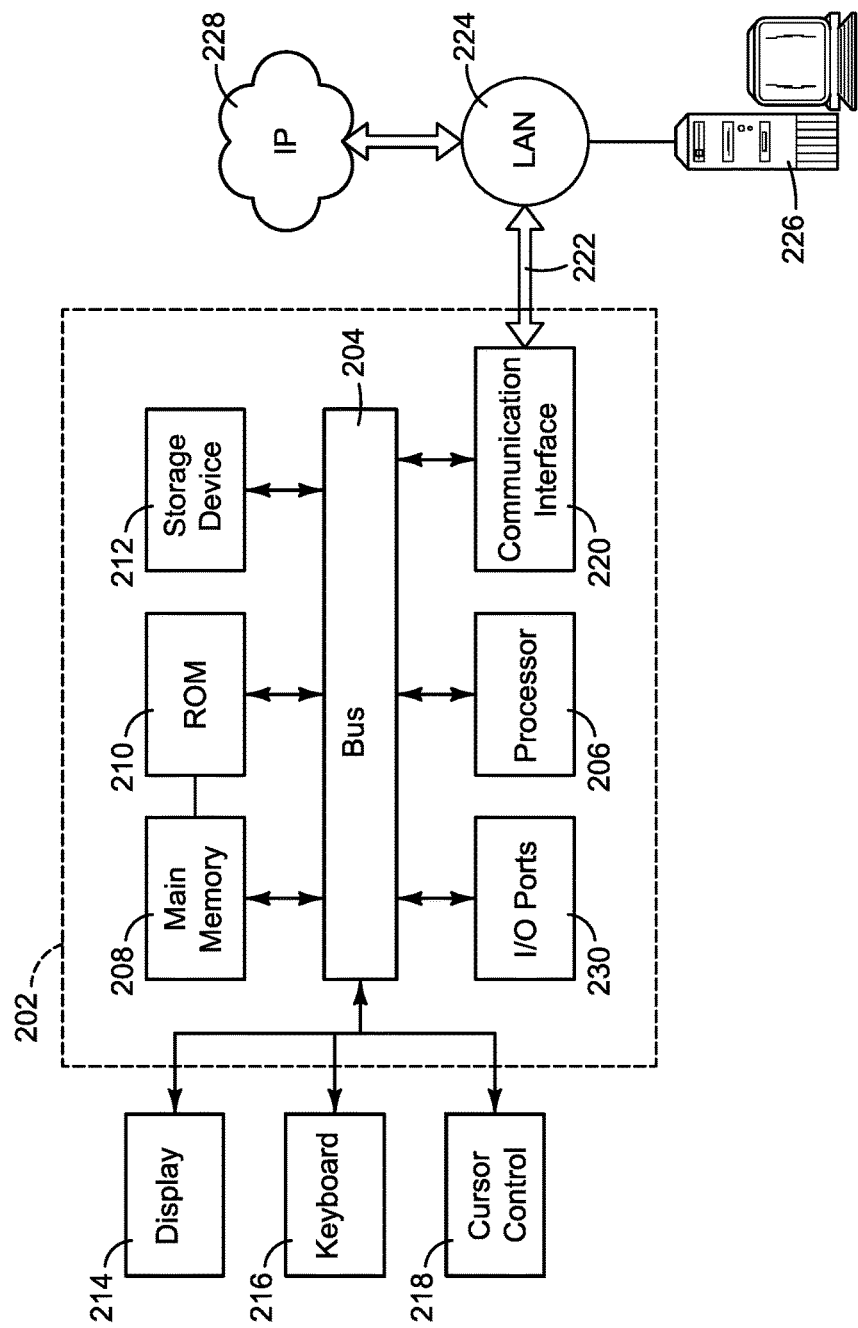
FIG. 17 is a block diagram of an exemplary computer system.

A fourth embodiment of the wheel hub safety device 100 is partially illustrated in FIGS. 14 through 16. The fourth embodiment is similar to the first embodiment illustrated in FIGS. 2 through 13, except as detailed below. In FIGS. 14 through 16, the lug nut rotation detector 170 is generally diamond shaped, having contacts (181, 184) roughly 180 degrees apart. A skilled artisan will be able to select an appropriate shape for the lug nut rotation detector in a particular embodiment based on various considerations, including the intended use of the wheel hub safety device, the intended arena within which the wheel hub safety device will be used, and the equipment and/or accessories with which the wheel hub safety device is intended to be used, among other considerations.

In the lug nut rotation detector 70 of FIGS. 2 through 13, the inner ring wall 60 comprises a pair of fixed contacts (85, 86) which are bridged by a conductive bridge contact 81 on the first arm 74. In the wheel hub safety device is illustrated in FIGS. 14 through 16, the lug nut rotation detector 170 comprise a pair of electrically connected contacts (contact 181 and contact 184). Contact 181 is on the first arm 174, and contact 184 is on the second arm 176. A first circuit has a first contact 185 on the outer ring wall 158 and a second contact 186 on the inner ring wall 160. A second circuit has a third contact 187 on the outer ring wall 158 and a fourth contact 188 on the inner ring wall. Wherein if the lug nut 24 loosens, contact 184 contacts the second contact 186 and contact 181 contacts the first contact 185, thereby completing a circuit and generating a signal (rotation sensor 180). Wherein if the lug nut 24 tightens, contact 184 contacts the third contact 187 and contact 181 contacts the fourth contact 188, thereby completing a circuit and generating a signal (rotation sensor 1180).

Optionally, the wheel hub safety device could comprise the components of the first circuit or the second circuit.

A fifth embodiment of the wheel hub safety device is similar to the first embodiment illustrated in FIGS. 2 through 13, except that the contact bridge is configured to bridge a first contact on the upper wall and a second contact on the lower wall.

A sixth embodiment of the wheel hub safety device is similar to the first embodiment illustrated in FIGS. 2 through 13, except that the contact bridge is configured to bridge a pair of contacts on the inner face of the inner ring wall.

A seventh embodiment of the wheel hub safety device is similar to the first embodiment illustrated in FIGS. 2 through 13, except that the contact bridge is configured to bridge a first contact on one of the upper wall, the lower wall, the outer ring wall, and the inner ring wall and a second contact on one of the upper wall, the lower wall, the outer ring wall, and the inner ring wall.

An eighth embodiment is similar to the first embodiment illustrated in FIGS. 2 through 13, except as detailed below. In the eighth embodiment the lug nut rotation detector has contacts on both the first and second arms which are configured for bridging pairs of contacts located on the inner wall ring and the outer wall ring.

In a ninth embodiment, the wheel hub safety device is for a vehicle having a hub and a wheel. The hub having a plurality of opposing equiradially disposed wheel bolts. The wheel having a plurality of opposing equiradially disposed holes spaced for mating engagement with the wheel bolts on the hub. The wheel is configured for attachment to the hub through use of a plurality of lug nuts threaded onto said wheel bolts. The wheel hub safety device comprising: a housing comprising a plurality of lug nut mounts, the housing held onto the hub through each lug nut mount connecting to one of the lug nuts, and a sensor connected to the housing. Preferably, the sensor detects the rotation of one of the lug nuts relative to the wheel bolt the lug nut is threaded onto. Preferably, the lug nut mount comprises a tubular portion configured for interference fit with one of the lug nuts. Preferably, the sensor generates a signal relating to a safety issue. A processor receives the signal and generates an alarm warning the operator of the vehicle of a safety issue. Further preferably, the sensor senses at least one of the following safety issues: a loose lug nut, wheel wobble, wheel hub wobble, wheel hub overheating, wheel detachment, hub safety device detachment, and wheel roll. Preferably, the lug nut mounts further comprise at least one indicator for visually indicating the position of the lug nut mount on the lug nut, and the housing comprises indicia adjacent the lug nut mounts. The at least one indicator can be oriented with respect to the indicia when the wheel hub safety device is installed on the wheel so that movement of the indicator relative to the indicia indicates rotation of the lug nut on the wheel bolt.

In the operation of an exemplary system, each wheel position of the vehicle will have one vehicle specific housing with lug nut rotation detectors (a "halo unit"). Each halo unit will be specific to the bolt pattern of each applicable vehicle. Each halo unit can fit steer, drive, trailer, or drop axle of vehicle and simply be reprogrammed for each specific location. The process of relearning each halo unit will include a handheld electronic reprogramming tool. Once the relearning process is completed the computer system and halo unit will be synced with each other. Preferably, the halo unit will firmly press onto the wheel hub assembly lug nuts and be secured with two locking lug nuts. Preferably, the halo unit will self-activate once vehicle begins to move and operator's electronic warning system (tablet computer) is powered by a key-on power supply. The halo units go into sleep mode once vehicle is parked and power is off on electronic warning system. The halo unit sensors will monitor conditions intermittently once every sixty seconds to five minutes to provide longer battery life. The halo unit roll sensors will activate immediately once one wheel position begins to rotate and communicate with other roll sensors. If other roll sensors show movement the roll sensor goes to sleep until one or more sensors indicate a non-rolling condition in reference to other rolling units. If halo unit lug nut switches, heat sensor, accelerometer, or knock sensor detect an issue the transmitter on the ring transmits a warning to the operator's electronic warning system via wireless transmitter amplifier located on each vehicle unit.

FIG. 14 illustrates a computer system 202 upon which some or all of the present invention may be implemented. The computer system 202 may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc.

The computer system 202 includes a bus 204 or other communication mechanism for communicating information, and a processor 206 coupled with bus 204 for processing the information. The computer system 202 also includes a main memory 208, such as a random access memory (RAM) or other dynamic storage device (e.g., dynamic RAM (DRAM), static RAM (SRAM), synchronous DRAM (SDRAM), flash RAM), coupled to bus 204 for storing information and instructions to be executed by processor 206. In addition, main memory 208 may be used for storing temporary variables or other intermediate information during execution of instructions to be executed by processor 206. Computer system 202 further includes a read only memory (ROM) 210 or other static storage device (e.g., programmable ROM (PROM), erasable PROM (EPROM), and electrically erasable PROM (EEPROM)) coupled to the bus 204 for storing static information and instructions for processor 206. A storage device 212, such as a magnetic disk or optical disk, may be provided and coupled to bus 204 for storing information and instructions.

The computer system 202 also includes input/output ports 230 to couple the computer system 202 to external devices. Such coupling may include direct electrical connections, wireless connections, networked connections, etc., for implementing automatic control functions, remote control functions, etc. Such external devices may include audio alarms (speakers), visual alarms (lights), alarms, lug nut rotation detectors, sensors, toggle switches, push-button switches, selector switches, joystick switches, limit switches, proximity switches, optical switches, pressure switches, radiant heat sensors, temperature switches, thermocouples, bimetallic strips, flame detectors, infrared thermometers, microbolometers, pyrometers, accelerometers, speed switches, piezoresistive accelerometers, knock sensor monitors, etc.

The computer system 202 may also include special purpose logic devices (e.g., application specific integrated circuits (ASICs)) or configurable logic devices (e.g., generic array of logic (GAL) or re-programmable field programmable gate arrays (FPGAs)). Other removable media devices (e.g., a compact disc, a tape, and a removable magneto-optical media) or fixed, high-density media drives, may be added to the computer system 202 using an appropriate device bus (e.g., a small computer system interface (SCSI) bus, an enhanced integrated device electronics (IDE) bus, or an ultra-direct memory access (DMA) bus). The computer system 202 may additionally include a compact disc reader, a compact disc reader-writer unit, or a compact disc jukebox, each of which may be connected to the same device bus or another device bus.

The computer system 202 may be coupled via bus 204 to a display 214 (e.g., liquid crystal display (LCD), light emitting diode (LED) display, voice synthesis hardware, voice synthesis software) for displaying and/or providing information to a computer user. The display 214 may be controlled by a display or graphics card.

The computer system 202 includes input devices, such as a keyboard 216 and a cursor control 218, for communicating information and command selections to processor 206. Such command selections can be implemented via voice recognition hardware and/or software functioning as the input devices. The cursor control 218, for example, is a mouse, a trackball, cursor direction keys, touch screen display, optical character recognition hardware and/or software, etc., for communicating direction information and command selections to processor 206 and for controlling cursor movement on the display 214. In addition, a printer may provide printed listings of the data structures, information, etc., or any other data stored and/or generated by the computer system 202.

The computer system 202 performs a portion or all of the processing steps of the invention in response to processor 206 executing one or more sequences of one or more instructions contained in a memory, such as the main memory 208. Such instructions may be read into the main memory 208 from another computer readable medium, such as storage device 212. One or more processors in a multi-processing arrangement may also be employed to execute the sequences of instructions contained in main memory 208. In alternative embodiments, hard-wired circuitry may be used in place of or in combination with software instructions. Thus, embodiments are not limited to any specific combination of hardware circuitry and software.

As stated above, the computer system 202 includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling the computer system 202, for driving a device or devices for implementing the invention, and for enabling the computer system 202 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The term "computer readable medium" as used herein refers to any medium that participates in providing instructions to processor 206 for execution. A computer readable medium may take many forms, including but not limited to, non-volatile media, volatile media, and transmission media. Non-volatile media includes, for example, optical, magnetic disks, and magneto-optical disks, such as storage device 212. Volatile media includes dynamic memory, such as main memory 208. Transmission media includes coaxial cables, copper wire and fiber optics, including the wires that comprise bus 204. Transmission media also may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, a carrier wave (described below), or any other medium from which a computer can read.

Various forms of computer readable media may be involved in carrying out one or more sequences of one or more instructions to processor 206 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to computer system 202 may receive the data on the telephone line and use an infrared transmitter to convert the data to an infrared signal. An infrared detector coupled to bus 204 can receive the data carried in the infrared signal and place the data on bus 204. The bus 204 carries the data to main memory 208, from which processor 206 retrieves and executes the instructions. The instructions received by main memory 208 may optionally be stored on storage device 212 either before or after execution by processor 206.

The computer system 202 also includes a communication interface 220 coupled to bus 204. Communication interface 220 provides a two-way data communication coupling to a network link 222 that may be connected to, for example, a local network 224 or to one or more remote sensor units, such as the lug nut rotation detectors described herein.

For example, communication interface 220 may be a wireless link, for instance a Bluetooth connection, implemented via the communication interface 220, wherein the communication interface 220 sends and receives electrical, electromagnetic or optical signals that carry digital data streams representing various types of information, including information from sensors.

In another example, communication interface 220 may be a network interface card to attach to any packet switched local area network (LAN). As another example, communication interface 220 may be an asymmetrical digital subscriber line (ADSL) card, an integrated services digital network (ISDN) card or a modem to provide a data communication connection to a corresponding type of telephone line. Wireless links may also be implemented via the communication interface 220. In any such implementation, communication interface 220 sends and receives electrical, electromagnetic or optical signals that carry digital data streams representing various types of information.

Network link 222 typically provides data communication through one or more networks to other data devices. For example, network link 222 may provide a connection to a computer 226 through local network 224 (e.g., a LAN) or through equipment operated by a service provider, which provides communication services through a communications network 228. In preferred embodiments, local network 224 and communications network 228 preferably use electrical, electromagnetic, or optical signals that carry digital data streams. The signals through the various networks and the signals on network link 222 and through communication interface 220, which carry the digital data to and from computer system 202, are exemplary forms of carrier waves transporting the information. The computer system 202 can transmit notifications and receive data, including program code, through the network(s), network link 222 and communication interface 220.

In one implementation of the computer system 202, the sensors (e.g., rotation sensor, temperature sensor, vibration sensor, motion sensor, knock sensor) send signals wirelessly to the communication interface 220 which is coupled to the bus 204. The processor 206 could process the signals, and determine whether or not an audio alarm or visual alarm connected to an input/output port 230 should be triggered. Information regarding the sensor data (signals) could also be displayed on a display 214 to the user. Further, through the communication interface 220 the computer system 202 could utilize a network link 222 to send data to a computer 226 (e.g., a remove computer in the vehicle owner's office) via a communications network 228 or a local network 224.

In another implementation, the computer system 202 comprises a tablet computer and software on the tablet computer utilized by the operator of the vehicle. The tablet computer connecting wirelessly to individual wheel hub safety devices located on the vehicle, either directly or through wireless connections with interceding transmitters/receivers. Such a tablet computer providing a large display for easy viewing by the operator while operating the vehicle. The tablet computer will monitor the individual wheel hub safety devices only once the vehicle is started so as to conserve batteries on rings and transmitters. The tablet computer will receive and provide live information while vehicle is in motion. The tablet computer will have the ability to go to sleep mode so as not to distract operator. The tablet computer will only show warnings if one or more of the individual wheel hub safety devices transmit a problem. The tablet computer can be customized by the operator to show live data at the push of a button. A "Relearn" process can be completed with the tablet computer and the tablet computer can be operated externally (outside of the cabin of the vehicle, for instance at each wheel location. The tablet computer may also have the ability to be easily removed to be recharged, either by in-cab 12 v docking station or 120 v station.

A method of monitoring a wheel hub comprises the steps of installing and using one or more of the embodiments disclosed herein.

Any suitable structure and/or material can be used for the components of the wheel hub safety device, and a skilled artisan will be able to select an appropriate structure and material for the wheel hub safety device in a particular embodiment based on various considerations, including the intended use of the wheel hub safety device, the intended arena within which the wheel hub safety device will be used, and the equipment and/or accessories with which the wheel hub safety device is intended to be used, among other considerations.

It is noted that all structure and features of the various described and illustrated embodiments can be combined in any suitable configuration for inclusion in a wheel hub safety device according to a particular embodiment. For example, a wheel hub safety device according a particular embodiment can include neither, one, or both of a transmitter and the sensor described above.

The foregoing detailed description provides exemplary embodiments of the invention and includes the best mode for practicing the invention. The description and illustration of these embodiments is intended only to provide examples of the invention, and not to limit the scope of the invention, or its protection, in any manner.

I claim:

1. An apparatus for determining whether at least one lug nut of a wheel has rotated from a reference position, the apparatus comprising:
    a housing comprising:
        a circular array of lug holes defined through a portion of the housing;
    a pair of conductive annular bands that are concentric with the circular array of lug holes;
    a plurality of lug nut rotation detectors, each of the lug nut rotation detectors:
        being configured for an engagement with a corresponding lug nut;
        being disposed proximal to, and concentric with, a corresponding lug hole of the housing such that the lug nut rotation detector can be rotated relative to the corresponding lug hole; and
comprising a conductive bridge contact; and
at least one sensor configured to determine when the pair of conductive annular bands is electrically bridged by at least one of one of the conductive bridge contacts.

2. The apparatus of claim 1, further comprising a motion sensor configured to detect an irregular rotation of the apparatus.

3. The apparatus of claim 1, further comprising a temperature sensor configured to determine a temperature of one or more portions of the apparatus.

4. The apparatus of claim 1, further comprising a transmitter configured to transmit a signal responsive to the sensor determining that the pair of conductive annular bands is electrically bridged by one of the conductive bridge contacts.

5. The apparatus of claim 1, wherein the pair of conductive annular bands is electrically bridged responsive to a relative rotation between a lug nut rotation detector and a corresponding lug hole of the housing.

6. The apparatus of claim 5, wherein the pair of conductive annular bands is not electrically bridged when the plurality of lug nut rotation detectors is configured in a reference position.

7. The apparatus of claim 1, wherein the housing further comprises a lower wall that the circular array of lug holes is defined therethrough.

8. The apparatus of claim 7, wherein at least one of the conductive annular bands is disposed on the lower wall.

9. The apparatus of claim 7, wherein the housing further comprises an outer ring wall that:
is connected to the lower wall;
is concentric with the circular array of lug holes; and
has a diameter greater than a diameter of the circular array of lug holes.

10. The apparatus of claim 9, wherein at least one of the conductive annular bands is disposed on the outer ring wall.

11. The apparatus of claim 9, wherein the housing further comprises an inner ring wall that:
is connected to the lower wall;
is concentric with the circular array of lug holes; and
has a diameter less than a diameter of the circular array of lug holes; and
wherein one of the conductive annular bands is disposed on the inner ring wall and another of the annular bands is disposed on the outer ring wall.

12. The apparatus of claim 7, wherein the housing further comprises an inner ring wall that:
is connected to the lower wall;
is concentric with the circular array of lug holes; and
has a diameter less than a diameter of the circular array of lug holes.

13. The apparatus of claim 12, wherein at least one of the conductive annular bands is disposed on the inner ring wall.

14. The apparatus of claim 8, wherein the housing further comprises an upper wall opposite the lower wall such that the lug nut rotation detectors are contained by the upper wall and lower wall; and wherein at least one of the conductive annular bands is disposed on the upper wall.

15. A sensor for determining that one or more lug nuts of a wheel have rotated from a reference position, the sensor comprising:
a housing forming a hollow disc, the housing comprising:
a lower wall containing a circular array of lug holes corresponding to the lug nuts of the wheel;
an upper wall;
an inner ring wall; and
an outer ring wall;
a plurality of lug nut rotation detectors disposed within the housing for mating with respective lug nuts of the wheel, each lug nut rotation detector being disposed concentric with a respective lug hole such that the lug nut rotation detector can rotate relative to the lug hole but not translate relative to the housing;
a pair of coaxial annular bands disposed within the housing; and
a plurality of conductive bridge contacts, each conductive bridge contact being attached to a respective lug nut rotation detector and configured to electrically bridge the pair of coaxial annular bands when the respective lug nut rotation detector is rotated a threshold rotation from a reference position.

16. The sensor of claim 15, wherein the upper wall contains a similar array of lug holes corresponding to the lug nuts of the wheel such that a portion of the lug nut rotation detectors can be viewed through the upper wall when the sensor is mounted on the wheel.

17. The sensor of claim 15, wherein the pair of coaxial annular bands are disposed on one or more of the lower wall, the upper wall, the inner ring wall, or the outer ring wall.

18. The sensor of claim 15, wherein the lug nut rotation detectors are mated to the respective lug nuts of the wheel through an interference fit.

19. A vehicle lug nut sensor for detecting a loosening of one or more lug nuts of a vehicle, the vehicle lug nut sensor comprising:
a plurality of lug nut rotation detectors disposed in a circular array, each lug nut rotation detector:
configured to interface with a corresponding lug nut of the vehicle;
configured to rotate relative to the vehicle lug nut sensor; and
comprising a conductive bridge contact disposed radially from a center of rotation;
two conductive annular bands disposed coaxially with the circular array;
a sensor for determining when the conductive annular bands are electrically bridged by one or more of the conductive bridge contacts; and
a housing configured to contain the lug nut rotation detectors, the conductive annular bands, and the sensor.

20. The vehicle lug nut sensor of claim 19, wherein the housing comprises a lower wall, an upper wall, and inner ring wall, and an outer ring wall; and
wherein the conductive annular bands are disposed on one or more of the lower wall, the upper wall, the inner ring wall, or the outer ring wall.

* * * * *